United States Patent [19]

Matsuo

[11] Patent Number: 5,157,310
[45] Date of Patent: Oct. 20, 1992

[54] CHANGEOVER CIRCUIT FOR RETRACE CAPACITOR

[75] Inventor: Noriaki Matsuo, Nagasaki, Japan

[73] Assignee: Mitsubishi Denki Kabushiki Kaisha, Tokyo, Japan

[21] Appl. No.: 765,312

[22] Filed: Sep. 25, 1991

[30] Foreign Application Priority Data

Oct. 12, 1990 [JP] Japan ............................. 2-274974

[51] Int. Cl.⁵ .................... H01J 29/70; H01J 29/76
[52] U.S. Cl. ................................................. 315/408
[58] Field of Search ....................................... 315/408

[56] References Cited

U.S. PATENT DOCUMENTS

| | | | |
|---|---|---|---|
| 4,695,774 | 9/1987 | Gent et al. | 315/408 |
| 4,906,903 | 3/1990 | Ochiai | 315/408 |
| 5,059,874 | 10/1991 | Oliver | 315/408 |

FOREIGN PATENT DOCUMENTS

| | | |
|---|---|---|
| 59-228293 | 12/1984 | Japan . |
| 1521917 | 10/1975 | United Kingdom . |
| 1544154 | 8/1977 | United Kingdom . |
| 1565937 | 4/1978 | United Kingdom . |
| 1576188 | 4/1978 | United Kingdom . |

Primary Examiner—Theodore M. Blum

[57] ABSTRACT

A changeover circuit for a retrace capacitor switches ON/OFF a retrace capacitor for generating retrace pulses. The retrace pulses are necessary for preferable horizontal or vertical scanning in a TV picture tube, a mounting display or the like. A relay for opening/closing the connection between the retrace capacitor and the ground is provided and the ON/OFF operation of the relay is controlled by a control circuit. A diode is provided in parallel to the relay so as to suppress the on-state resistance and the negative inrush current.

5 Claims, 2 Drawing Sheets

CHANGEOVER CIRCUIT FOR RETRACE CAPACITOR

BACKGROUND OF THE INVENTION

1. Field of the Invention

The present invention relates to a changeover circuit for a retrace capacitor for generating retrace pulses which are necessary for electron beam scanning when a picture is displayed on the screen of a display monitor.

2. Description of the Related Art

In a home TV cathode-ray tube, the electric signals obtained by scanning a picture by an imaging device are scanned on a monitor screen by an electron beam in the same way as by the imaging device so as to display the picture.

A display monitor has recently been used as a displaying device for information processing such as a computer and a word processor and it is capable of displaying a picture of higher resolution than a TV picture tube.

In this type of device in which an electron beam is deflected by a deflection circuit for the purpose of horizontal and vertical scanning on the monitor screen, it is necessary to generate retrace pulses which correspond to a predetermined scanning frequency. For this purpose, a changeover circuit for a retrace capacitor having a structure such as that shown in FIG. 2 is conventionally used.

FIG. 2 shows a changeover circuit for a retrace capacitor of a monitor FA3415 produced by Mitsubishi Electric Corporation.

As shown in FIG. 2, two retrace capacitors 2, 3 are connected in parallel through, the supply terminals on the side closer to the live potential 1, and field-effect transistors (hereinunder referred to as "FET's") 4, 5 for executing a switching operation are inserted between the other terminals of the retrace capacitors 2 and 3, respectively, and ground 6. An output signal having a predetermined level is output from a control circuit 7 to the gates of the FET's 4 and 5. The control circuit 7 controls the ON-OFF switching operations of the FET's 4 and 5 in accordance with a change in the output level.

A conventional changeover circuit for a retrace capacitor having the above-described structure generates retrace pulses for electron beam scanning by switching the FET's 4 and 5 by the control circuit 7 in accordance with a predetermined frequency pulse.

In the conventional changeover circuit for retrace capacitors, since a voltage as high as about 1,000 V is applied to both ends of the retrace capacitors 2 and 3 shown in FIG. 2, the FET's 4 and 5 used for switching the retrace capacitors also must have a withstand voltage of about 1,000 V.

Each of the FET's 4, 5 has an on-state resistance (a resistance which is existent when the FET is switched on), which generates heat when the FET is switched on. To prevent the generation of heat, a heat sink for cooling the FET's 4, 5 is necessary.

In this way, in the case of using an FET, the changeover circuit inconveniently cost a great deal.

If a relay is used for the switching operation in place of the FET, it is possible to reduce the cost.

However, since the on-state resistance of the relay is extremely small and the inrush current becomes very large, it is necessary to use a relay having a large rated current, which leads to the increase in size of the changeover circuit.

SUMMARY OF THE INVENTION

Accordingly, it is an object of the present invention to eliminate the above-described problems in the related art and to provide a cheap and small-sized changeover circuit for a retrace capacitor which can reduce the on-state resistance, which is unlikely to generate heat and which can reduce the inrush current at the time of switching.

To achieve this aim, a changeover circuit for a retrace capacitor according to the present invention comprises:

A) a relay for connecting the ground and one electrode of a retrace capacitor by switching ON to OFF or vice versa;

B) a diode connected in parallel to the relay for establishing electric conduction in the state in which the electrode of the retrace capacitor which is connected to the ground by the relay is at a negative potential; and C) a control circuit for turning ON/OFF the relay in accordance with the target of a retrace pulse generation period.

In the present invention, the diode has a damping function at the time of ON/OFF switching. In other words, the diode has a function of suppressing the on-state resistance. The heat generated by the on-state resistance is therefore suppressed, and a cheap changeover circuit which dispenses with a heat sink is obtained. In addition, in the present invention, the diode has a function of clamping the potential of the electrode of the retrace capacitor which faces the relay to the zero potential. Therefore, the flow of the current in the negative direction is eliminated from the inrush current. This fact allows a small-sized relay (having a small rated current) to be selected for the changeover circuit. As a result, it is possible to reduce the size of the changeover circuit.

Embodiments of the present invention which have various structures will be considered. For example, in order to switch a retrace capacitor for generating horizontal retrace pulses which are used for horizontal scanning by an electron beam, the control circuit turns ON/OFF the relay in accordance with the period which corresponds to the horizontal scanning frequency as the target. In order to unify the control, it is preferable that one control circuit takes charge of a plurality of relays and unitarily switches a plurality of retrace capacitors.

The above and other objects, features and advantages of the present invention will become clear from the following description of preferred embodiment thereof, taken in conjunction with the accompanying drawings.

DESCRIPTION OF THE PREFERRED EMBODIMENT

A preferred embodiment of a changeover circuit for retrace capacitors according to the present invention will be explained hereafter.

Figure 1:
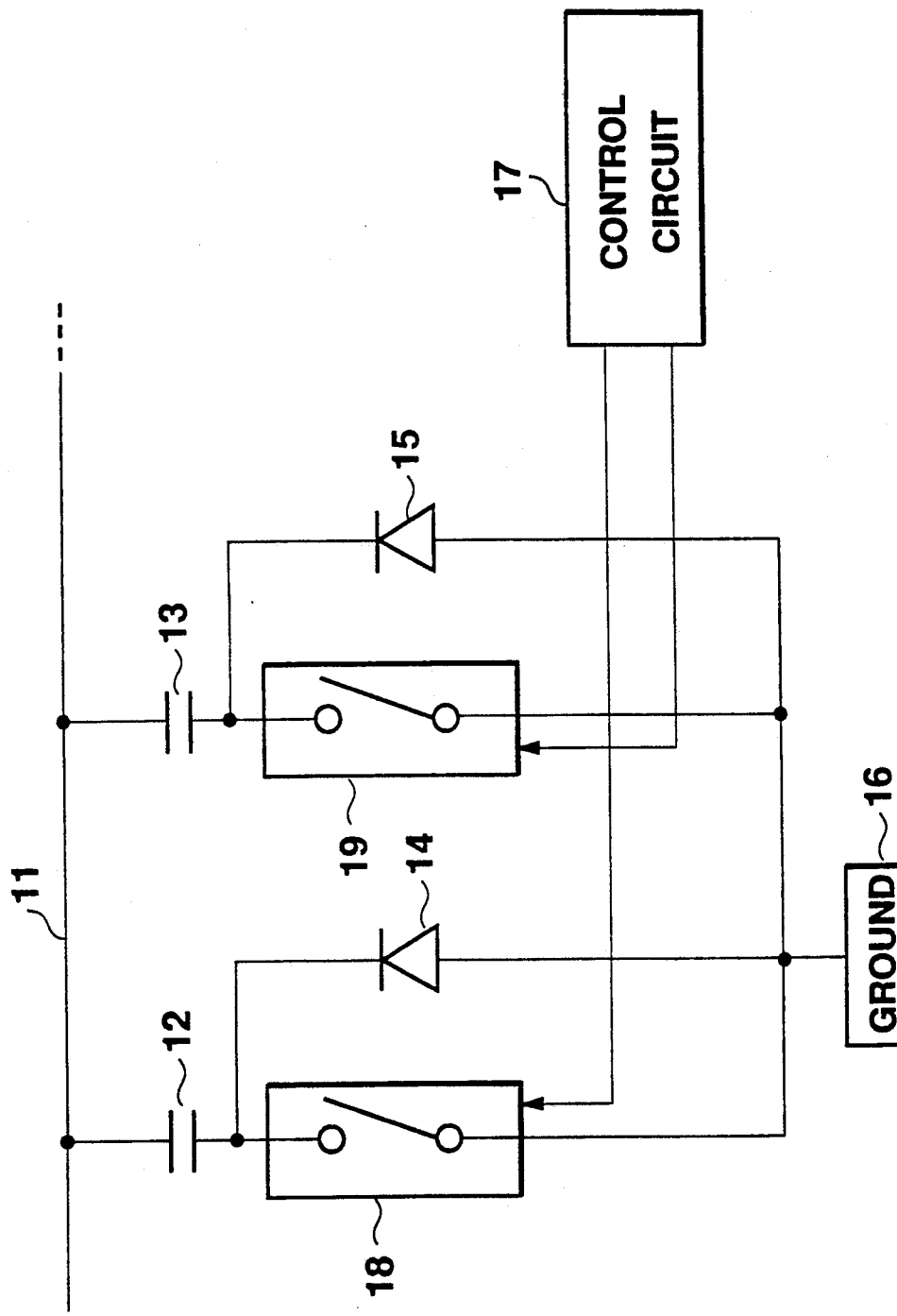
FIG. 1 is a circuit diagram of the structure of an embodiment of a changeover circuit for a retrace capacitor according to the present invention.

FIG. 1 shows an embodiment of a changeover circuit for a retrace capacitor according to the present invention.

Figure 2:
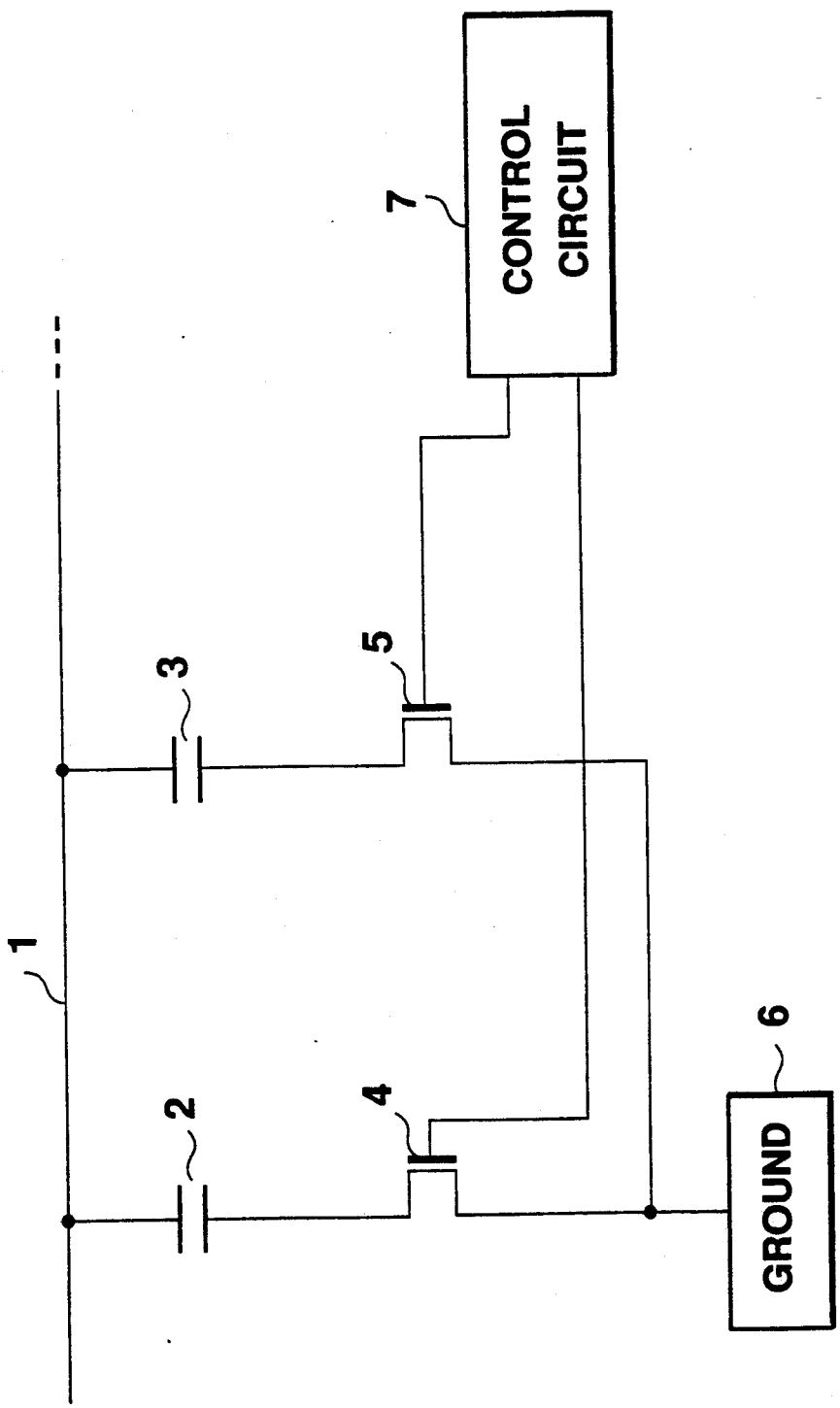
FIG. 2 is a circuit diagram of the structure of a conventional changeover circuit for a retrace capacitor.

In FIG. 1, since live 11, retrace capacitors 12, 13 and the ground 16 are the same as those in the conventional changeover circuit shown in FIG. 2, explanation thereof will be omitted.

The characteristic feature of this embodiment is that not an FET but a relay 18 and a damper diode 14 for executing a switching operation are provided in parallel between the retrace capacitor 12 and the ground 16. The cathode of the damper diode 14 is connected to the retrace capacitor and the anode thereof to the ground 16. Therefore, a current constantly flows only in the direction from the ground 16 to the retrace capacitor 12, and one electrode of the retrace capacitor 12 is clamped to the ground potential.

Similarly, a relay 19 and a damper diode 15 are provided in parallel between the retrace capacitor 13 and the ground 16.

The ON/OFF operation of each of the relays 18, 19 is controlled by a control circuit 17.

The operation of this embodiment will now be explained with reference to FIG. 1. The operation of generating horizontal retrace pulses in correspondence with a desired horizontal scanning frequency in the horizontal deflection circuit of a display monitor will here be explained.

In the state in which a predetermined high voltage is applied to the electrodes on the side closer to the live 11 in FIG. 1, the currents flowing in the directions from the retrace capacitors 12, 13, respectively, to the ground 16 are cut off by the damper diodes 14, 15, respectively, while the relays 18, 19 are off. The retrace capacitors 12, 13 are therefore not charged. In other words, this state is the same in the state in which the FET's 4, 5 are off in the conventional changeover circuit shown in FIG. 2.

At the moment the relays 18, 19 shown in FIG. 1 are turned on, the potentials of the electrodes of the retrace capacitors 12, 13 which face the relays 18, 19, respectively, are about to change to negative potentials due to the chattering of the relay contacts, so that the inrush currents flowing on the retrace capacitors 12, 13 are about to increase. However, the damper diodes 14, 15 constantly cause the current to flow in the direction from the ground 16 to the retrace capacitors 12, 13, respectively. Consequently, the potentials of the electrodes of the retrace capacitors 12, 13 which face the relays 18, 19, respectively, are clamped to the ground potential.

That is, the potentials of the electrodes of the retrace capacitors 12, 13 which face the relays 18, 19, respectively, are not lowered to negative potentials. The inrush current is therefore reduced.

It is therefore possible to adopt a relay having a small rated current for each of the relays 18, 19 in this embodiment, thereby enabling the size of the changeover circuit for a retrace capacitor to be reduced. Since it is unnecessary to use an FET unlike a conventional changeover circuit, a countermeasure to the generation of heat due to the on-state resistance is dispensed with. Thus, a cheap changeover circuit for a trace capacitor is realized.

Although changeover in the retrace capacitors is explained in this embodiment, a changeover circuit can be composed in a similar way by using a damper diode in the case of executing another switching operation by using a capacitive load.

As described above, according to the present invention, a cheap and a small-sized changeover circuit for a retrace capacitor is realized in which the on-state resistance at the time of ON/OFF switching of the retrace capacitor is so small as to suppress the generation of heat and in which the inrush current is reduced.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A changeover control circuit for a retrace capacitor, comprising:

voltage means for providing a voltage to said retrace capacitor, said retrace capacitor generating retrace pulses, at a predetermined scanning frequency, for display on a display monitor;

control means for generating a control signal; and switching means including, relay means for receiving the control signal and connecting said retrace capacitor to a ground potential when the control signal is in a high state, and damping means for damping an on-state resistance of said relay means when the control signal is in the high state, for minimizing an inrush current into said relay means, and for minimizing the withstand voltage of said relay means.

2. The changeover control circuit of claim 1, wherein said control means utilizes a horizontal scanning frequency to generate the control signal.

3. The changeover control circuit of claim 1, wherein said control means generates the control signal for a plurality of retrace capacitors, said changeover control circuit including a plurality of switching means, one for each of said plurality of retrace capacitors.

4. The changeover control circuit of claim 3, wherein said control means utilizes a horizontal scanning frequency to generate the control signal.

5. The changeover control circuit of claim 1, wherein said damping means minimizes the inrush current into said relay means by clamping a potential of an electrode of said retrace capacitor, connected to said relay means, to a zero potential.

* * * * *